UNITED STATES PATENT OFFICE.

ZUISHO HOTTA, OF TOKYO, JAPAN.

ANTIFOULING AND ANTICORROSIVE COMPOSITION.

No. 916,869.　　　　　Specification of Letters Patent.　　Patented March 30, 1909.

Application filed August 21, 1908.　Serial No. 449,663.

*To all whom it may concern:*

Be it known that I, ZUISHO HOTTA, a subject of the Emperor of Japan, residing at No. 7 Ichome Tamachi Shibaku, Tokyo, Japan, have invented a new and useful composition of matter to be used as an antifouling and anticorrosive lacquer specially suitable for the protection of ships' bottoms, although the same may be used with advantage as a coating for metallic articles that are subject to corrosive influences, and the chief object of this invention is to provide a composition of the class referred to that shall include a large percentage of poisonous salts without disturbing the viscosity or interfering with the rapid drying and durable quality of the said composition, of which the following is a specification.

My composition consists of the following named ingredients combined in about the proportions stated viz:

| | |
|---|---|
| Urushi (Japanese lacquer gum) | 100 pounds. |
| Solid mineral salts poisonous to the micro-organism | 100 pounds. |
| Thymol | 10 pounds. |

The stated salts may consist of mercurous and mercuric arsenite; mercurous and mercuric arsenate, arsenite and arsenate of copper, hydrogen copper arsenite, mercurous and mercuric phosphate, mercurous and mercuric pyro-phosphate, copper phosphate, and copper-pyro-phosphate, and these may be used separately or may be combined. The Japanese lacquer gum which I use is the well known commercial product of the tree *Rhus vernicifera*. The proportions stated may be altered as the particular conditions may require, provided however that the conditions are such that the said salts act both as the drier or fast hardening re-agent for the lacquer, and also as the poison or antiseptic for micro-organism, and so that the thymol (which is perhaps the most important ingredient in this invention) acts as a re-agent to render the composition of proper fluidity or not too viscous, while its slight and almost imperceptible solubility in water admits the poisonous ingredients to diffuse all over the surface of the ship's bottom when the latter is immersed in water slowly but continuously, thus protecting the surface from fouling.

In using the above named composition the metallic surface to be treated should first be freed from rust and other impurities, and then the said composition is evenly spread over it with a proper brush. The composition dries and hardens in a few hours and, when hardened, the composition is a perfect insulator to galvanic action and protects the metallic surface from rusting.

What I claim, and desire to secure by Letters-Patent is:—

The herein-described composition of matter, consisting of urushi (Japanese lacquer gum), salts poisonous to micro-organism, and thymol, substantially as described and for the purpose specified.

In testimony whereof I have signed my name to this specification in the presence of two subscribing witnesses.

ZUISHO HOTTA.

Witnesses:
　KIHACHINO MATSUKI,
　MARION ELLIOT PITMAN.